Inventor:
Donald W. White,
by Paul R. Webb, II
His Attorney.

United States Patent Office 3,445,293
Patented May 20, 1969

3,445,293
ELECTRICAL DEVICE COMPRISING SOLID ELECTROLYTE AND COMPOSITE GAS-IMPERVIOUS ELECTRODE
Donald W. White, Burnt Hills, N.Y., assignor to General Electric Company, a corporation of New York
Filed Jan. 4, 1965, Ser. No. 422,987
Int. Cl. H01m 27/10
U.S. Cl. 136—86                                    4 Claims

ABSTRACT OF THE DISCLOSURE

A composite gas-impervious electrode for a high temperature electrical device. The composite electrode comprises a porous solid oxygen-ion conducting metal oxide matrix, the interstices (or pores) of which are occupied by metallic silver rendering the composite gas-impervious. With this construction molten metallic silver is made available during operation at temperatures over 960.5° C. for the transport of gas therethrough, but the area of molten silver exposed at the outer surface of the composite electrode is greatly reduced in comparison to prior art molten silver electrodes for fuel cells, for example, and considerably less silver is required for comparable electrode areas.

---

This invention relates to high temperature fuel cells and more particularly to solid, gas-impervious electrodes for such high temperature fuel cells.

Fuel cells, operable at high temperatures in the range of 1000° C. to 1200° C., are shown in U.S. Letters Patent 3,138,487 and 3,138,490 which are assigned to the same assignee as the present application. Each of these fuel cells employs a solid oxygen-ion electrolyte, solid electrodes, fuel and oxidant supplies for the respective electrodes, and electrical leads connected to the respective electrodes. Such fuel cells provide a low voltage direct current power source on a continuous basis. Such cells have application in various chemical process industries, such as the manufacture of aluminum and the electro-refining of copper. Furthermore, these cells can be employed to operate direct current motors.

In a fuel cell of the above type, it would be desirable to minimize the amount of silver employed as the cathode; to minimize the exposed surface area of the silver, and to provide an electrode which functions as either a cathode or anode. The present invention is directed to such an improved solid, gas-impervious electrode for a high temperature fuel cell electrolyte.

It is an object of my invention to provide an improved solid, gas-impervious electrode for a high temperature fuel cell.

It is another object of my invention to provide an improved high temperature fuel cell which employs an improved solid, gas-impervious cathode.

It is a further object of my invention to provide an improved high temperature fuel cell which employs an improved solid, gas-impervious anode.

It is a still further object of my invention to provide an improved high temperature fuel cell which employs improved solid, gas-impervious electrodes.

In carrying out my invention in one form, a gas-impervious composite electrode comprises a solid, porous oxygen-ion conducting metal oxide matrix, and silver impregnated in and filling the pores thereof.

Figure 1:
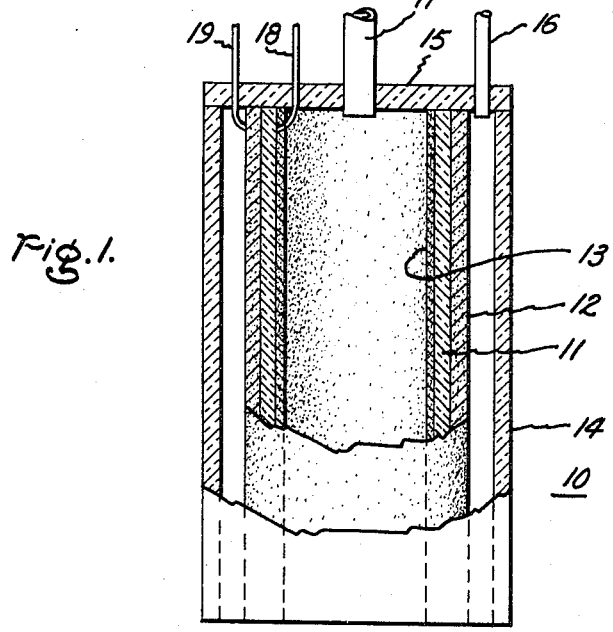
Figure 2:
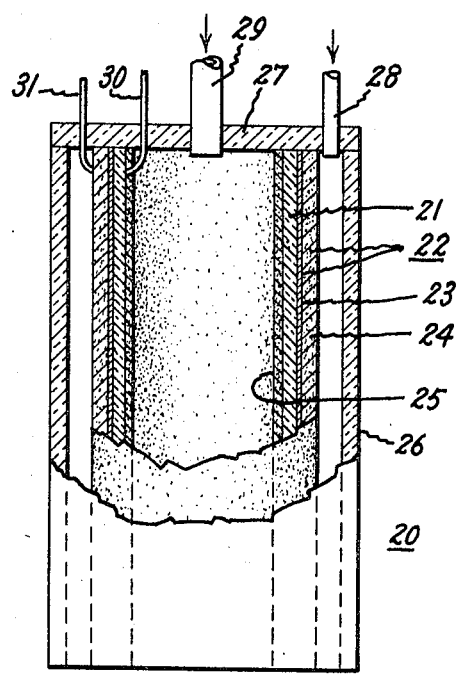

These and various other objects, features and advantages of the invention will be better understood from the following description taken in connection with the accompanying drawing in which:

FIGURE 1 is a sectional view of a high temperature fuel cell embodying my invention; and FIGURE 2 is a sectional view of a modified high temperature fuel cell embodying my invention.

In FIGURE 1, a high temperature fuel cell is shown generally at 10 which comprises a solid oxygen-ion electrolyte 11 in the form of a hollow tubular member of stabilized zirconia, a gas-impervious composite cathode 12 of a solid, porous oxygen-ion conducting metal oxide matrix with silver impregnated in and filling the pores thereby providing a gas-impervious electrode, the cathode adhering tightly as a layer to the outer surface of electrolyte 11, and a solid, porous carbonaceous anode 13 in contact with the inner surface of electrolyte 11. The electrodes are reversible with cathode 12 on the inner surface of electrolyte 11 and anode 13 on the outer surface of electrolyte 11.

An outer hollow member such as a tube of alumina 14 surrounds and is spaced from the exterior surface of cathode 12 to provide an air passage between cathode 12 and the inner surface of tube 14. A cover 15, for example, of the same material as tube 14, is provided at the upper surface of tube 14. An inlet tube 16 extends into the air passage between cathode 12 and tube 14 to introduce a gaseous oxidant containing molecular oxygen from a source (not shown) into this passage. A second tube 17 is provided through cover 15 and communicates with the space defined by the interior wall of anode 13 within electrolyte 11. Tube 17 provides initially a flushing gas such as nitrogen through this space to exclude molecular oxygen from the cell prior to operation of the cell and subsequently to provide a fuel such as a carbonaceous material in the form of a hydrocarbon gas of methane into this space. Additionally, cover 15 excludes molecular oxygen from anode 13 during cell operation. A nickel lead 18 is shown extending through cover 15 and positioned adjacent the inner surface of electrolyte 11 whereby it contacts anode 13. A platinum lead 19 extends through cover 15 and is in contact with cathode 13 of the cell. The free ends of leads 18 and 19 are connected to apparatus, such as an electric motor (not shown), being operated by cell 10.

While gas-impervious electrode 12 is described in FIGURE 1 as the cathode, this gas-impervious electrode is also suitable as an anode. Furthermore, both electrodes of such a cell are constructed of the above-described gas-impervious structure to provide a suitable high temperature fuel cell.

In FIGURE 2 of the drawing there is shown a modified fuel cell 20 which comprises a solid oxygen-ion electrolyte 21 in the form of a tube of stabilized zirconia, a gas-impervious composite cathode 22 comprising a film of silver 23 on the surface of electrolyte 21, and a solid, porous oxygen-ion conducting metal oxide matrix with silver impregnated in and filling the pores as shown at 24 thereby providing a gas-impervious electrode, and a solid, porous carbonaceous anode 25 in contact with the interior surface of electrolyte 21. As in cell 10 shown in FIGURE 1 of the drawing, the anode and cathode of FIGURE 2 are reversible. Additionally, both the cells shown in FIGURES 1 and 2 are suitable in forms other than in a tubular form which are shown in these figures.

An outer hollow tubular member 26 of alumina surrounds and is spaced from the exterior surface of cathode 22 to provide an air passage between cathode 22 and tube 26. A cover 27, for example, of the same material as tube 26, is provided at the upper surface of tube 26. An inlet tube 28 extends into the air passage between cathode 22 and tube 26 to introduce a gaseous oxidant containing molecular oxygen from a source (not shown) into this passage. A second tube 29 extends through cover 27 and communicates with the space defined by the inner wall of anode 25 within electrolyte 21 to provide initially a flushing gas such as nitrogen through this space prior to cell operation, and subsequently to provide a fuel such as a carbonaceous material in the form of a hydrocarbon gas of methane into this space. Additionally, cover 27 excludes molecular oxygen from anode 25 during cell operation. A nickel lead 30 extends through cover 28 and is positioned adjacent electrolyte 21 to contact anode 25. A platinum lead 31 extends through cover 27 and contacts cathode 22.

While gas-impervious electrode 22 is described in FIGURE 2 as the cathode, this gas-impervious electrode is also suitable as an anode. Both electrodes of such a cell are also constructed of the above-described gas-impervious structure to provide a suitable high temperature fuel cell. If desired, a suitable cell is constructed by employing one electrode from FIGURE 1 of the drawing and one electrode from FIGURE 2 of the drawing. Either electrode type is suitable for the anode or cathode of such a cell.

I discovered unexpectedly that an efficient stable fuel cell was constructed which comprised a solid oxygen-ion electrolyte, a cathode in contact with one surface of the electrolyte, the cathode comprising a solid, porous oxygen-ion conducting metal oxide, and silver impregnated in and filling the pores thereof from face-to-face of the cathode, means for supplying a gaseous oxidant containing molecular oxygen to the cathode, an anode in contact with the opposite surface of the electrolyte, and means for supplying a fuel to the anode. Such a cell is formed also with both of the electrodes comprising a solid, porous oxygen-ion conducting metal oxide, and silver impregnated in and filling the pores thereof from face-to-face of the cathode.

Such a high temperature fuel cell is also formed with either one or both electrodes having a silver film in contact with the electrolyte, a solid, porous oxygen-ion conducting metal oxide matrix, silver impregnated in the matrix, or silver impregnated in and filling the pores of the matrix, and the silver impregnated matrix in contact with the silver film. Such a cell is also formed with one electrode comprising a solid, porous oxygen-ion conducting metal oxide, and silver impregnated in and filling the pores thereof while the other electrode comprises a silver film in contact with the electrolyte, a solid porous oxygen-ion metal oxide, silver impregnated in the matrix, or silver impregnated and filling the pores of the matrix, and the silver impregnated matrix in contact with the silver film.

Such a solid oxygen-ion metal oxide matrix, and silver impregnated and filling the pores thereof provides a gas-impervious, composite article for employment in a high temperature fuel cell. This composite electrode is constructed also to adhere firmly to a solid oxygen-ion member thereby comprising a composite article. Such a composite article is also constructed with such an electrode on opposite surfaces of the member.

A composite article is formed which comprises a solid oxygen-ion member, and a composite electrode in contact with at least one surface of the member which electrode comprises a silver film in contact with the member, a solid porous oxygen-ion conducting metal oxide matrix, silver impregnated in the matrix, or silver impregnated in and filling the pores of the matrix, and the silver impregnated matrix in contact with the silver film. Such a composite article is also formed with two such electrodes or one electrode of each of the above types to form a composite article.

The above electrodes minimize the amount of silver employed and minimize the exposed surface area of the silver at the exposed face of such electrodes. Such electrodes function as cathodes, anodes or both.

The preferred solid oxygen-ion material or electrolyte is solid stabilized zirconia. However, other solid oxygen-ion material such as solid doped thoria, solid stabilized zirconia with an addition of iron-oxide, or solid doped thoria with an addition of iron oxide are suitable.

Solid stabilized zirconia, which is a solid oxygen-ion electrolyte material, is a compound with a cubic crystal structure consisting of zirconia to which is added calcium oxide, yttrium oxide or a mixture of rare earth oxides. For example, a preferred solid zirconia member is employed which is stabilized with 11 molecular percent calcium oxide. Other stabilized zirconia, which may also be employed as a stabilized zirconia member, are discussed in "Oxide Ceramics" by Ryshkewitch, Academic Press, 1960, particularly on pages 354, 364 and 376 thereof.

Solid doped thoria is also a solid oxygen-ion electrolyte material which consists of thoria to which is added calcium oxide, yttrim oxide, or a mixture of rare earth oxides. For example, a solid doped thoria consists of thoria which is doped with the addition of four molecular percent calcium oxide to increase its conductivity.

Solid stabilized zirconia with an iron addition is also a solid oxygen-ion electrolyte material which consists of 0.5 to 10.5 weight percent of iron oxide, and the balance being stabilized zirconia. Doped thoria may also be employed with a similar iron oxide addition thereto.

The matrix must be a solid, porous, and oxygen-ion conducting metal oxide. I prefer to employ the same material for the matrix which is employed for the member or the electrolyte. However, this is not essential, providing the matrix is a solid, porous oxygen-ion conducting metal oxide.

In a fuel cell, a gaseous oxidant containing molecular oxygen is supplied during cell operation to the electrode which functions as the cathode. Fuel is supplied during cell operation to the electrode functioning as the anode. Either or both of these electrodes is a composite electrode as described above.

For example, the fuel is a carbonaceous fuel from a hydrocarbon gas, or a carbonaceous liquid to provide both the anode and fuel for the cell. This is accomplished by thermal decomposition and deposition of the fuel onto the anode surface of the electrolyte during cell operation.

If one of the above composite electrodes is employed only for the anode in such a fuel cell, another cathode material is employed such as doped tantalum pentoxide, or lithiated nickel oxide. If one of the above composite electrodes is employed only for the cathode in such a fuel cell, another anode material is employed such as a carbonaceous material, iron saturated with carbon, cobalt tin saturated with carbon, or at least 50 volume percent of nickel and the balance being an intimate dispersion of a compatible solid oxygen-ion material. Fuels of hydrogen or carbon monoxide are also employable in such a fuel cell.

In the construction of fuel cell 10, shown in FIGURE 1 of the drawing, gas-impervious composite cathode 12 has a solid porous oxygen-ion conducting metal oxide matrix of stabilized zirconia with silver impregnated in and filling the pores thereof. Cathode 12, which adheres firmly to electrolyte 11 of solid stabilized zirconia, is prepared, for example, by mixing together stabilized zirconia and silver, and forming a slurry. The exterior surface of the zirconia tube is painted with the slurry. Subsequently, the coated tube is sintered to densify the cathode layer and to produce also adherence of the cathode layer to the exterior surface of the stabilized zirconia electrolyte. Anode 13 which is crabonaceous material deposited from a carbonaceous gas such as methane is provided on the opposite surface of stabilized zirconia electrolyte 11 during the operation of the cell. A gaseous oxidant such as air is supplied through inlet tube 16 to the chamber defined by the exterior surface of cathode 12 and the interior surface of tube 14.

In the construction of fuel cell 20 in FIGURE 2 of the drawing, cathode 22 is a composite structure which is prepared, for example, in two steps. First, a film of silver is painted on the exterior surface of electrolyte 21 as shown at 23. Secondly, stabilized zirconia and silver are mixed together to form a slurry. The slurry is then painted on the silver coated electrolyte. The assembly is then sintered to densify the matrix impregnated with silver. As it was described above, anode 25 is formed from a carbonaceous gas such as methane during cell operation while an oxidant such as air is supplied through inlet tube 28 to the chamber between the outer surface of cathode 22 and the inner surface of tube 26.

Fuel cells 10 and 20 which are shown in FIGURES 1 and 2 of the drawing are also suitable in forms other than tubular which are shown in these FIGURES. However, in these FIGURES the cells have been shown as tubular members and have been described accordingly.

In the operation of fuel cell 10 shown in FIGURE 1 of the drawing, heat such as waste heat, is supplied from a source, not shown, to raise the temperature of electrolyte 11 and cathode 12 of cell 10 to a temperature in the range of about 1000° C. to 1200° C. The silver which was impregnated in composite cathode 12 becomes molten at its melting point (960.5° C.), and is then saturated with a gaseous oxidant containing molecular oxygen, such as air, by supplying the oxidant through tube 16 to the air passage between cathode 12 and the interior surface of tube 14. Anode 13 is formed from carbonaceous material supplied from a hydrocarbon gas through inlet 17. The reaction at the silver-metal oxide matrix interface is as follows:

(1) 

The oxygen ions move through the metal oxide matrix and electrolyte 11 to combine with carbon in accordance with the following reaction at the anode-electrolyte interface:

(2) 

The electrons, which are given up at the anode, are conducted through lead 18 to apparatus, for example an electric motor (not shown), being operated while oxygen at the cathode combines with the returning electrons. Carbon monoxide, which is generated at the anode, is released through the opening at the bottom of the cell to the atmosphere, used to provide further heat for cell 10, or fed to a fuel cell employing carbon monoxide as a fuel. Cover 15 is provided at the upper portion of the fuel cell to exclude molecular oxygen from the anode during cell operation. Prior to the introduction of the hydrocarbon gas through inlet 17, an inert gas such as nitrogen is flushed through the space defined by inner surface of electrolyte 11 to remove any molecular oxygen prior to cell operation. The hydrocarbon gas is then introduced through inlet 17 into the space defined by the interior wall of electrolyte 11 to decompose the hydrocarbon gas to carbon which deposits on the interior surface of electrolyte 11 as anode 13.

The operation of the cell shown in FIGURE 2 of the drawing is similar to the operation of the cell shown in FIGURE 1. However, during cell operation, the silver of silver film 23 is molten as well as the silver impregnated in the metal oxide matrix 24. Silver film 23 is positioned between electrolyte 21 and silver impregnated matrix 24. Reactions 1 and 2 are also applicable to the cell operation. However, reaction 1 takes place at the silver film-electrolyte interface.

Four fuel cells were assembled and operated as follows. Cells 1 and 2 were set up in accordance with FIGURE 1 while cells 3 and 4 were set up in accordance with FIGURE 2.

Each of the fuel cells 1–4 employed a solid oxygen-ion electrolyte of zirconia stabilized with eleven molecular per cent calcium oxide. Each electrolyte was 0.025 inch thick. Cells 1 and 2 employed a cathode of a solid, porous oxygen-ion conducting oxide matrix of stabilized zirconia, and silver impregnated in and filling the pores thereof. Cells 3 and 4 employed a cathode of a silver film in contact with the electrolyte, a solid, porous oxygen-ion conducting metal oxide matrix of stabilized zirconia, and silver impregnated in and filling the pores of the matrix. Cells 1–4 were operated with an oxidant of air and at an average temperature of 985° C. Cells 1, 2 and 4 operated on a fuel of methane gas while cell 3 operated on hydrogen gas.

Cell 1 employed an anode of pyrolytic carbon with a nickel wire. Cell 2 employed an anode of pyrolytic carbon with a molybdenum wire. Cell 3 employed an anode of a nickel-zirconia cermet. Cell 4 employed an anode of pyrolytic carbon with a nickel-zirconia cermet.

Table I sets forth for each fuel cell the time period of operation, the load voltage in volts, and the current density in milliamperes per square centimeters.

TABLE I

| Time | | Load Voltage (v.) | Current Density (ma./cm.²) |
|---|---|---|---|
| Cell No.: | | | |
| 1 | 4 days | 0.5 | 102 |
| 2 | 23 days | 0.6 | 59 |
| 3 | 9 days | 0.5 | 61 |
| 4 | 46 days | 0.29 | 104 |

While other modifications of this invention and variations thereof which may be employed within the scope of the invention have not been described, the invention is intended to include such as may be embraced within the following claims.

What I claim as new and desire to secure by Letters Patent of the United States is:

1. In an electrical device for operation at temperatures in excess of 960.5° C. (the melting point of silver), which device comprises an anode layer and a cathode layer at least one of which is gas-impervious and of metallic silver, this anode and cathode being separated by and in direct contact with a layer of a sintered solid oxide-ion electrolyte selected from the group consisting of stabilized zirconia and doped thoria, the improvement wherein the gas-impervious metallic silver electrode consists of solid oxide-ion material and metallic silver, said oxide-ion material being selected from the above-mentioned group and being in the form of a porous layer having the pores from face-to-face thereof filled with metallic silver.

2. The improvement substantially as recited in claim 1 wherein a thin layer of metallic silver is disposed between the silver-filled oxide-ion material layer and the electrolyte layer.

3. In a fuel cell for operation at temperatures in excess of 960.5° C. (the melting point of silver), which fuel cell comprises an anode layer and a cathode layer at least one of which is gas impervious and of metallic silver, this anode and cathode being separated by and in direct contact with a layer of a sintered solid oxide-ion electrolyte selected from the group consisting of stabilized zirconia and doped thoria, the improvement wherein the gas-impervious metallic silver electrode consists of solid oxide-ion material and metallic silver, said oxide-ion material being selected from the above-mentioned group and being in the form of a porous layer having the pores thereof from face-to-face filled with metallic silver.

4. The improvement substantially as recited in claim 3 wherein a thin layer of metallic silver is disposed between the silver-filled oxide-ion material layer and the electrolyte layer.

References Cited

UNITED STATES PATENTS

| | | |
|---|---|---|
| 3,068,311 | 12/1962 | Chambers et al. |
| 3,138,487 | 6/1964 | Tragert _____ 136—86 |
| 3,235,473 | 2/1966 | Le Duc. |
| 3,257,239 | 6/1966 | Shultz et al. |
| 3,300,344 | 1/1967 | Bray et al. _____ 136—86 |
| 3,300,343 | 1/1967 | Huber et al. _____ 136—86 |

WINSTON A. DOUGLAS, *Primary Examiner.*

MELVYN J. ANDREWS, *Assistant Examiner.*

U.S. Cl. X.R.

136—120